United States Patent [19]

Mendelson et al.

[11] Patent Number: 4,514,823
[45] Date of Patent: Apr. 30, 1985

[54] APPARATUS AND METHOD FOR EXTENDING A PARALLEL CHANNEL TO A SERIAL I/O DEVICE

[75] Inventors: Richard N. Mendelson; Douglas M. O'Neal; Leo A. Sharp, Jr., all of Boca Raton, Fla.

[73] Assignee: International Business Machines Corporation, Armonk, N.Y.

[21] Appl. No.: 339,525

[22] Filed: Jan. 15, 1982

[51] Int. Cl.³ .............................................. G06F 9/00
[52] U.S. Cl. ..................................................... 364/900
[58] Field of Search ................................. 364/200, 900

[56] References Cited

U.S. PATENT DOCUMENTS

| | | | |
|---|---|---|---|
| 4,162,536 | 7/1979 | Morlem | 364/900 |
| 4,228,495 | 10/1980 | Bernhard et al. | 364/200 |
| 4,307,447 | 12/1981 | Provanzano | 364/200 |
| 4,319,338 | 3/1982 | Grudowski | 364/900 |

*Primary Examiner*—Gareth D. Shaw
*Assistant Examiner*—John G. Mills
*Attorney, Agent, or Firm*—Harry W. Barron; Richard E. Bee

[57] ABSTRACT

There is disclosed apparatus and a method for extending a parallel channel of the host processor over a serial link to a remote peripheral device. The apparatus includes a microprocessor within I/O channel extension logic which responds to either instructions or data from a host processor. The instructions are of the type commanding the I/O device to perform a specific operation and the data is provided in response to requests for data from the I/O device. The channel extension logic is coupled to the host processor's channel and thus is able to obtain data from the host storage by cycle steal techniques. Within the channel extension logic are means to serialize the information and transmit it in a serial manner over the link. The microprocessor within the channel extension logic creates a frame, including a control byte, which identifies the type of information followed by the data, which frame is then communicated over the serial link to the I/O device. The I/O device also includes a microprocessor and associated logic which responds to the frames communicated by the channel extension logic and generates a frame consisting of a control byte identifying the information type and associated data which is then communicated back over the serial link to the channel extension logic to request action by the channel extension logic or indicate completion of the operation. The I/O device may, for instance, request data be obtained from or stored in the host memory by cycle steal techniques and thereby utilize the features of the host and host channel despite only being coupled thereto by a serial link.

11 Claims, 12 Drawing Figures

| CONTROL BYTE | CONTROL BYTE DEPENDENT DATA |

FIG. 8     FRAME TO I/O DEVICE 20

| TYPE | CONTROL BYTE | DATA |
|------|--------------|------|
| A1 | DPC CMD | IDCB CMD FIELD (1) + IDCB DATA FIELD(2) |
| A2 | CYCLE STEAL CMD | IDCB CMD FIELD (1) + DCB (16) |
| A3 | DATA | BYTE COUNT (2) + DATA (N) |

FIG. 9     FRAME TO LOGIC 18

| TYPE | CONTROL BYTE | DATA |
|------|--------------|------|
| B1 | INTERRUPT REQUEST | ICC (1) + IIB/ISB (1) |
| B2 | CYCLE STEAL FROM HOST STORAGE | HOST ADDRESS (2) + KEY (1) + BYTE COUNT(2) |
| B3 | CYCLE STEAL TO HOST STORAGE | HOST ADDRESS (2) + KEY (1) + BYTE COUNT(2) + DATA(N) |

APPARATUS AND METHOD FOR EXTENDING A PARALLEL CHANNEL TO A SERIAL I/O DEVICE

This invention relates to extending a host processor's channel over a serial link to a peripheral device and, more particularly, to a method and apparatus for communicating the information manifested on a host processor's channel to a peripheral device over a serial communication link.

In the past, peripheral devices have been attached to a computer host processor in a parallel manner. For instance, in U.S. Pat. No. 4,038,642, in the name of M. A. Bouknecht, et al, which patent was granted July 26, 1977 and assigned to the assignee hereof, an I/O device such as a printer, a keyboard or a display is connected by a parallel bus through an I/O attachment to the host processor's channel. In this manner, the host and the I/O device can communicate with one another in a known manner.

However, as the I/O devices associated with general purpose processors become more distant from the host processor, it becomes difficult to attach these devices through a parallel bus to the host channel. For instance, peripheral devices may be positioned several hundred feet away or even across the country from the host processor. In such case, the only communication link between the peripheral device and the host processor may be a single serial line. Such a line can be coaxial cable, for a device connected several hundred feet away from the host, or microwave communication using a satellite or telephone lines for communicating to devices connected many miles apart.

Where the devices are serially connected to the host processor, efficiently controlling the device becomes a serious problem. Instead of the many parallel lines of the host channel being coupled to the device, such as in the prior art U.S. Pat. No. 4,038,642, the single line limits the amount of information which can be communicated between the peripheral device and the host processor.

For instance, if the peripheral device is a printer, the prior art teaches that the control of the printer is done by the processor sending the control signal over its channel to a printer attachment designed to control the printer. This has the advantage that each time the I/O device desires additional data, it can use all of the facilities of the host processor and its channel to communicate that data. Even where modern I/O devices having intelligence associated therewith, such as microprocessors are used, direct parallel connection is required for the device to process commands and obtain data.

Modern data processing devices include a function known as cycle steal or direct memory access in which one module can directly access the main memory associated with the processor and read data therefrom or write data thereto without the processor intervening. By using the cycle steal or direct memory access techniques, considerable time is saved in the communication of data between the host processor and the I/O device. However, for the I/O device to utilize the cycle steal or direct memory access techniques, the I/O device must have a direct link into the host processor's channel so that the host can be disabled during the cycle steal or direct memory access data communications.

However, when only a single communication line exists between the processor and the I/O device, utilizing all features of the host processor, such as cycle steal or direct memory access, becomes impossible since no direct access to the host processor's channel exists.

In accordance with one aspect of the present invention, there is disclosed a method of extending a channel from a host processing system to a remote device comprising the steps of generating an information array associated with a command at the host processor, generating a communication header function at the host processor, combining the information array and the header function into a formated communication message and transmitting the message over a serial communication link to the device.

One preferred embodiment of this invention is hereafter described with specific reference being made to the following figures, in which.

Figure 1:
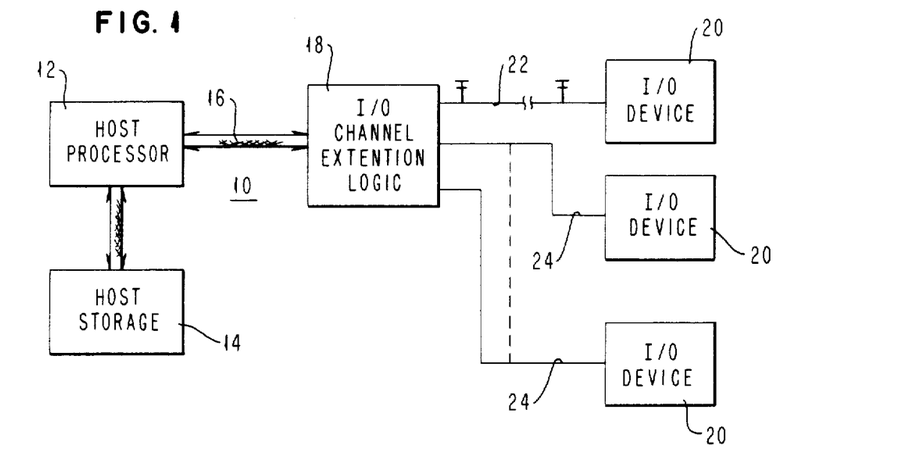
FIG. 1 is a block diagram of a host system connected over a serial channel to a plurality of I/O devices utilizing the I/O channel extension logic of the subject invention.

Referring now to FIG. 1, a block diagram of system 10 of the present invention is shown. System 10 includes a host central processing unit 12, and associated host storage 14, which together may be a conventional minicomputer system, such as the IBM Series/1 minicomputer manufactured and sold by the IBM Corporation. Host processor 12 communicates with devices over a host channel 16 described in detail in the aforementioned U.S. Pat. No. 4,038,642 and may include 81 lines as described in that patent. Connected to host channel 16 is I/O channel extension logic 18 which is described in more detail in FIG. 3. Logic 18 may have a plurality, such as four, of input output (I/O) devices 20 (e.g., printers, displays, keyboards and the like) connected thereto over a serial communication link such as telephone lines or microwave transmitting and receiving devices 22 or over a directly attached serial line 24, such as coaxial cable. Conventional communication techniques between logic 18 and the I/O devices 20 such as the synchronous data link communication (SDLC) protocols with standard electrical interfaces such as EIA RS232C or EIA RS422A may be used.

In operation, host CPU 12 includes circuitry allowing a peripheral device attached thereto, such as logic 18, to perform a cycle steal operation directly on storage 14. When this happens, logic 18, for instance, directly addresses the storage 14 and obtains information therefrom or writes information thereto. Such cycle steal operation is well known in the art and explained in the aforementioned U.S. Pat. No. 4,038,642. However, in order for the cycle steal operation to be effective, it is necessary to send information over certain lines of host channel 16. Logic 18 is thus able to perform the cycle steal function.

However, it is desirable that the I/O devices 20 attached to logic 18 over the serial link 22 or 24 should also be able to cycle steal the information to or from storage 14. This can be done by utilizing the protocol of this invention for the communication between logic 18 and I/O devices 20 in conjunction with the circuit designs of logic 18 and the portion of I/O device 20 shown respectively in FIGS. 3 and 4.

Figure 2A:
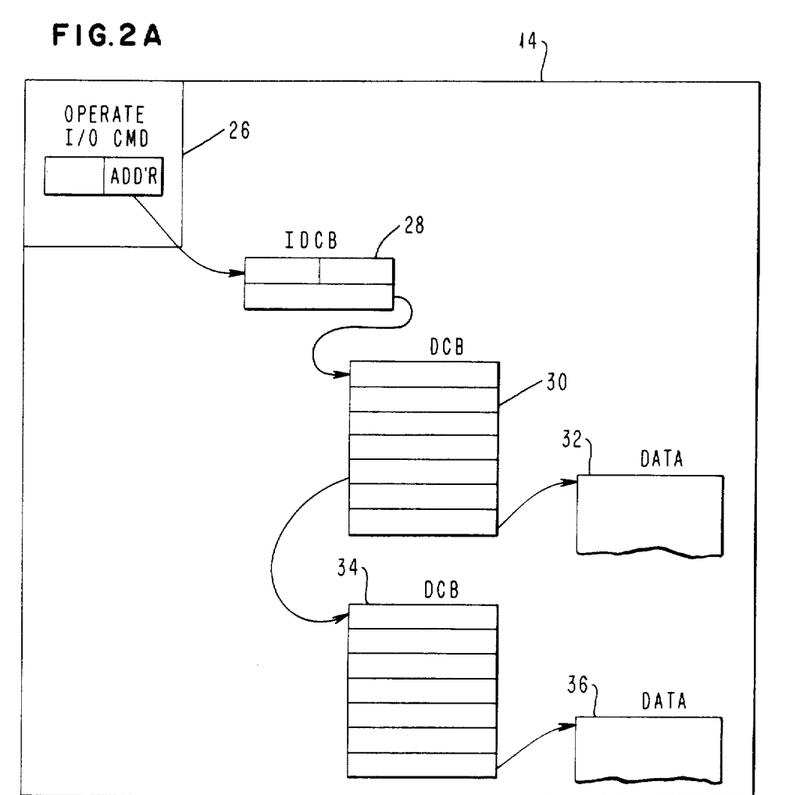
FIG. 2A is a memory map showing the various components and their storage positions required to cause a function at an I/O device to be performed.

Before describing the protocol of the subject invention, it is desirable to understand the manner in which host CPU 12 issues a command and the data to be communicated to devices 20. Thus, referring to FIG. 2A, a map of host storage 14 is shown. Within host storage 14 is a computer program 26 for controlling host processor 14. This program includes an instruction entitled Operate I/O Command which is used to cause one of the devices 20 to perform a function. Within the Operate I/O Command instruction is an effective address which points to an intermediate device control block (IDCB) 28, shown in more detail in FIG. 2B. IDCB 28 includes two words, each word consisting of two bytes, in which byte 0 of word 0 is a command field and byte 1 of word 0 is a device address field which designates to which of the I/O devices the instruction in program 26 applies. The second word of the IDCB 28 is a data field which depends upon the particular function of the IDCB and particularly, depends upon the information contained in the command field. The IDCB 28, for instance, may be a direct program control (DPC) command, such as a Write Immediate command, in which case the data to be written would be the data in the data field. On the other hand, the IDCB command field may be a cycle steal type instruction in which case the information in the data field is the address of a device control block (DCB) 30. The device control block, such as used in the Series/1 processor, is an 8 word field, which is shown in more detail in FIG. 2C. One of the words, such as word 7 shown in FIG. 2C, may contain the address of a block of data 32 within storage 14 which, for instance, may be the block of data desired for a printer I/O device 20 to print, or a display I/O device 20 to display. The number of bytes of data in block 32 is defined by word 6 of DCB 30. Other words which are well known include a control word in word 0. Words which may be device dependent are contained in words 1-4 and a chain address is contained in word 5. Whether or not chaining occurs depends on the setting of a chaining bit in word 0 of the DCB and if chaining of DCB's is indicated, the chain address in word 5 points to a second DCB 34 which, in turn, may point to a further data field 36, as shown in FIG. 2A.

Figure 3:
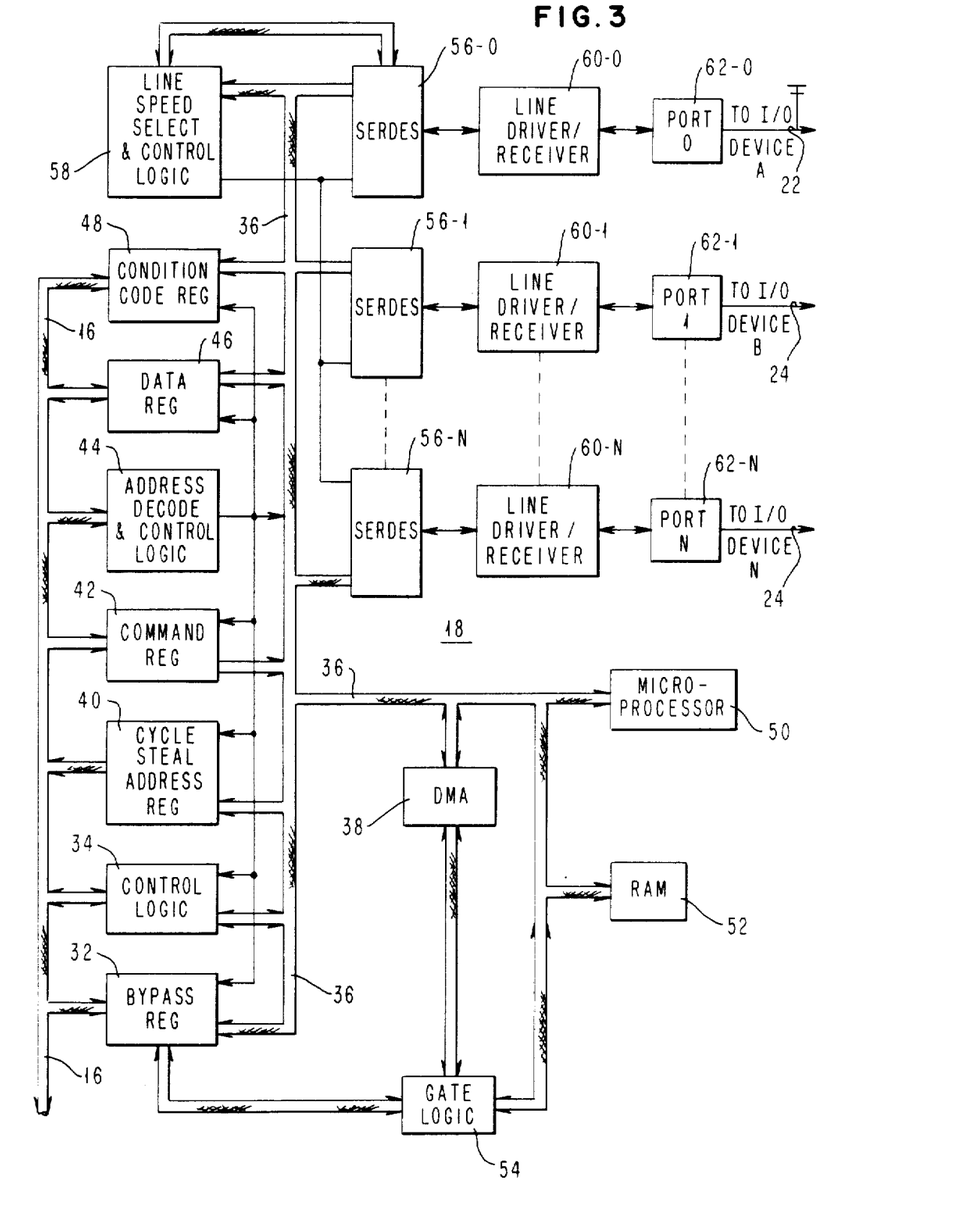
FIG. 3 shows in more detail the I/O channel extension logic of FIG. 1.

Referring now to FIG. 3, I/O channel extension logic 18 is shown in more detail. As recalled from FIG. 1, logic 18 is interconnected to host CPU 12 over the host channel 16, which includes address, data and control buses. The address and data buses are both applied to a by-pass register 32. Necessary ones of the control lines from host channel 16 are applied to control logic 34 which, in turn, applies signals to the microprocessor channel 36 to control DMA 38 and microprocessor 50. DMA 38 may be a conventional direct memory access module, such as the 8257 and microprocessor 50 may be a conventional microprocessor such as the 8085, both manufactured by the Intel Corporation of Santa Clara, Calif.

In addition, the address bus portion of host channel 16 is applied to cycle steal register 40, command register 42 and address decode and control logic 44. Registers 40 and 42 and logic 44 are described in more detail in U.S. Pat. No. 4,309,754 in the name of J. M. Dinwiddie, Jr., which patent was granted on Jan. 5, 1982. Briefly, the cycle steal address register 40 stores the host storage 14 address from which data is to be fetched or into which data is to be stored in the cycle steal mode. This address is stored in register 40 through operation of DMA 38 and microprocessor 50. The address decode and control logic 44 monitors the host channel 16 address bus for an Operate I/O Command address signal which selects logic 18 or an I/O device 20 connected thereto. Upon detecting the proper address signal, logic 44 causes the I/O command to be stored in command register 42. Command register 42 thereafter communicates with microprocessor 50 via interrupt or polling to indicate the occurrence of an Operate I/O Command instruction.

The data bus portion of channel 16 is coupled to data register 46 and applies data to and receives data from host channel 16. The condition code interrupt (CCI) lines of the control bus of host channel 16 are coupled to condition code register 48 to channel 16. Condition code register 48 has applied thereto the interrupt condition code (ICC) from the microprocessor 50 over microprocessor channel 36. Data register 46 also applies data to and receives data from the data bus portion of microprocessor channel 36. Address decode and control logic 44 provides signals to data register 46, command register 42, cycle steal address register 40, control logic 34 and the bypass register 32 as well as to the microprocessor channel 36 to control these blocks in a known manner.

Figure 2B:
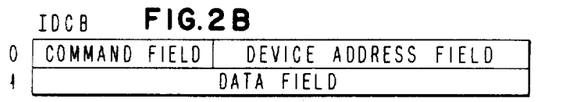
FIG. 2B is a detailed showing of an intermediate device control block (IDCB)
Figure 2C:
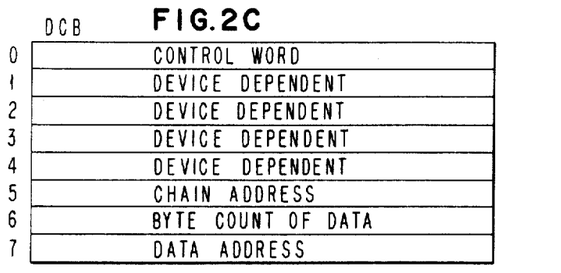
FIG. 2C is a detailed showing of a device controlled block (DCB)

The output from the command register 42 is the command field of the IDCB as shown in FIG. 2B and is applied over the data bus portion of microprocessor channel 36. The address bus portion of microprocessor channel 36 is applied as the input to the cycle steal address register 38 which applies these address signals over the address bus portion of host channel 16, as explained above.

Microprocessor 50 also has associated therewith microprocessor random access memory 52, which in response to the address and data buses of microprocessor channel 36 has data stored therein or data read therefrom in a known manner. DMA 38 provides signals to gate logic 54 to control a DMA operation upon memory 52 and through bypass register 32 to host storage 14 associated with host processor 12.

Logic 18 also includes a serializer/deserializer (SERDES) 56-0 through 56-N, such as the 8251 manufactured and sold by the Intel Corporation of Santa Clara, Calif., for each of the plurality of I/O devices 20 which can be coupled to logic 18. In FIG. 3, three such ports are shown, labeled port 0, port 1 and port N, with it being understood that any number of ports can exist as long as that number is within the capacity of the data transferred and the speed and capacity of microprocessor 50. For instance, where microprocessor 50 is an 8085 microprocessor, the number of I/O devices 20 may be four. It further should be noted that the serial line connecting the peripheral devices to logic 18 may either be a direct line, such as line 24 associated with port 1 and port N or the telephone lines or microwave sending and receiving stations such as shown and connected to port 0. Each of the SERDES 56-0 through 56-N have applied thereto the parallel information contained on the data bus portion of the microprocessor channel 36. Each of the SERDES 56-0 through 56-N are controlled as to the speed in which data is transmitted by a control line from line speed and select control logic 58. The serial output of each of the SERDES 56-0 through 56-N is applied as a serial signal through an associated line driver/receiver 60-0 through 60-N and an associated port connector 60-0 through 60-N to the serial link 22 or 24. Information can also be sent from the peripheral device 20 to logic 18, in which case information is applied from the serial link 22 or 24 through an associated one of the port 0 through port N connectors 62-0 through 62-N, and line driver/receiver 60-0 through 60-N to a SERDES 56-0 through 56-N. It should be noted that, as is the case with port 0 and line driver/receiver 60-0, additional controls from the line speed select and control logic 58 are required to control the encoding and decoding of the signal where it is sent over either the telephone lines or through microwave receiving stations 22. It should also be noted that more than one I/O device 20 can be multidropped from a port, although this is not shown.

Figure 4:
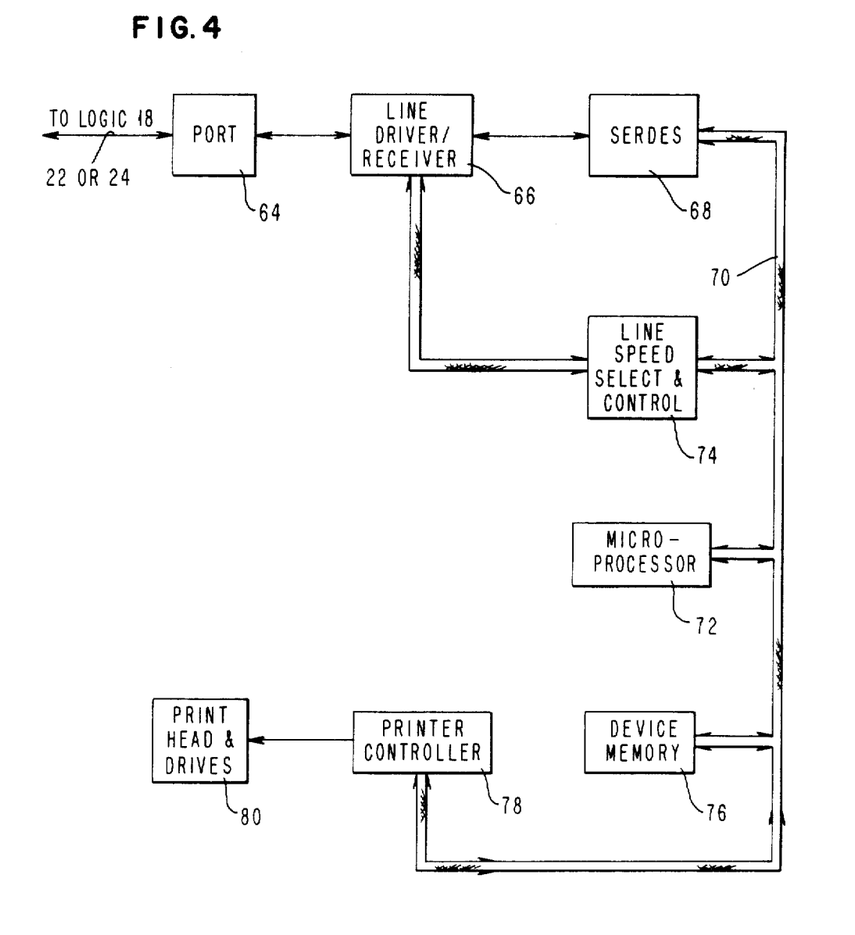
FIG. 4 shows the logic associated with an I/O device, such as a printer.

The operation of the various components within FIG. 3 will be explained hereinafter with respect to the flow diagram shown in FIGS. 5A and 5B. However, prior to undertaking such a description, it is necessary to understand the corresponding logic found in each of the I/O devices 20 which is shown in FIG. 4. Thus, referring to FIG. 4, the serial link 22 or 24 connecting the I/O device with logic 18 is applied through a corresponding port 64 which may be a conventional printed circuit board connector to a line driver/receiver circuit 66. From circuit 66 the serial information is applied to a SERDES 68 which also may be an 8251 device manufactured and sold by the Intel Corporation and which converts the serially applied data thereto into parallel data which is applied to the data bus portion of the I/O device channel 70. The I/O device 20 includes a microprocessor 72, such as an Intel 8085 microprocessor, which is coupled to the address, data and control buses which comprise the I/O device channel 70. The I/O device channel 70 is also applied to a line speed selecting control logic 74 which controls the line driver/receiver circuit 66 in the manner previously described with respect to FIG. 3. In addition, the I/O device microprocessor 72 has associated therewith a device memory 76 which responds to the signals on the address and data buses of I/O device channel 70.

If, for instance, the I/O device 20 is a printer, it will also include a printer controller 78 and printer mechanism 80 of a standard type. For instance, such a printer could be a conventional wire matrix printer and the printer controller could be an 8295 printer controller manufactured and sold by the Intel Corporation.

Figure 5A:
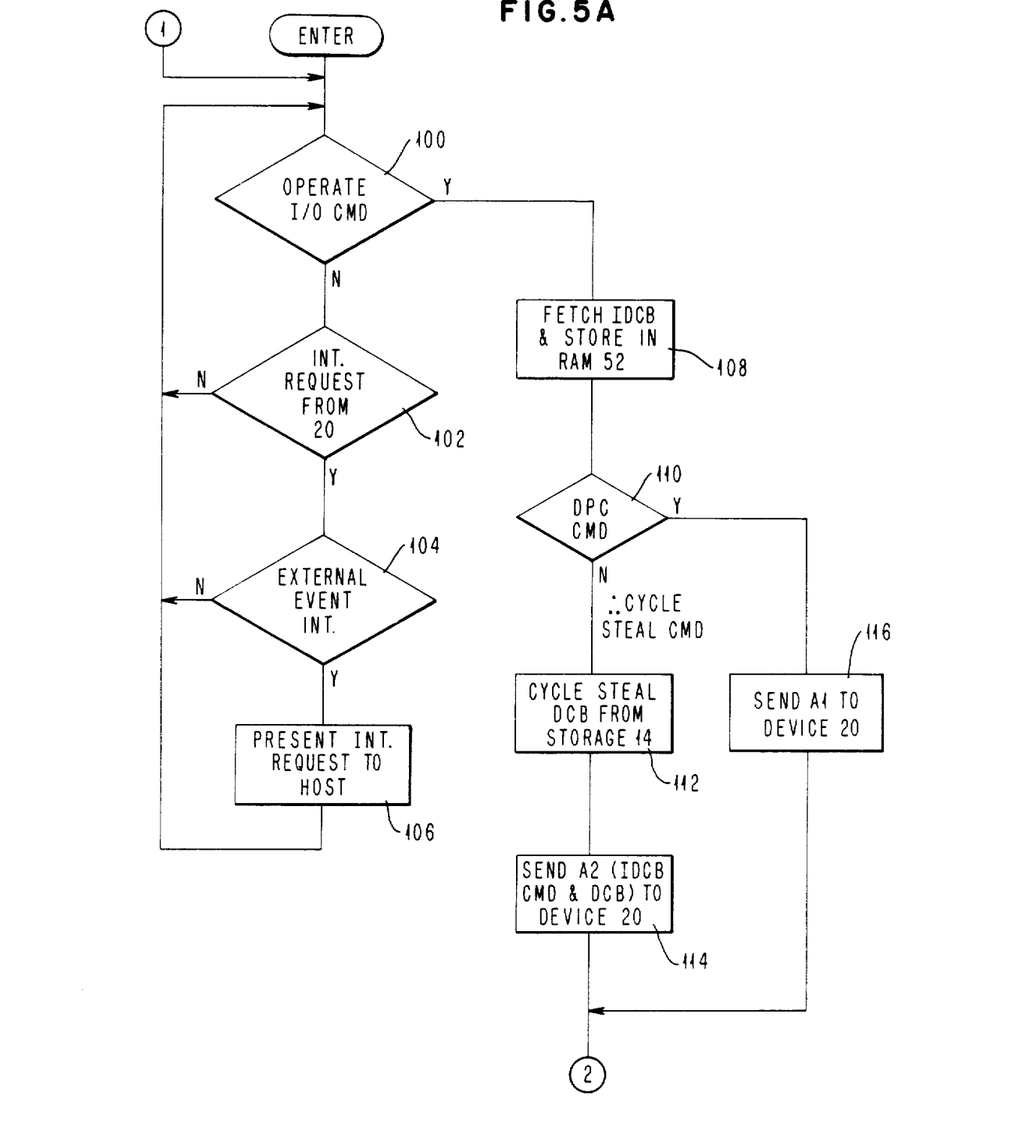
FIGS. 5A and 5B together constitute a flow diagram of the operation of the microprocessor shown in FIG. 3.
Figure 5B:
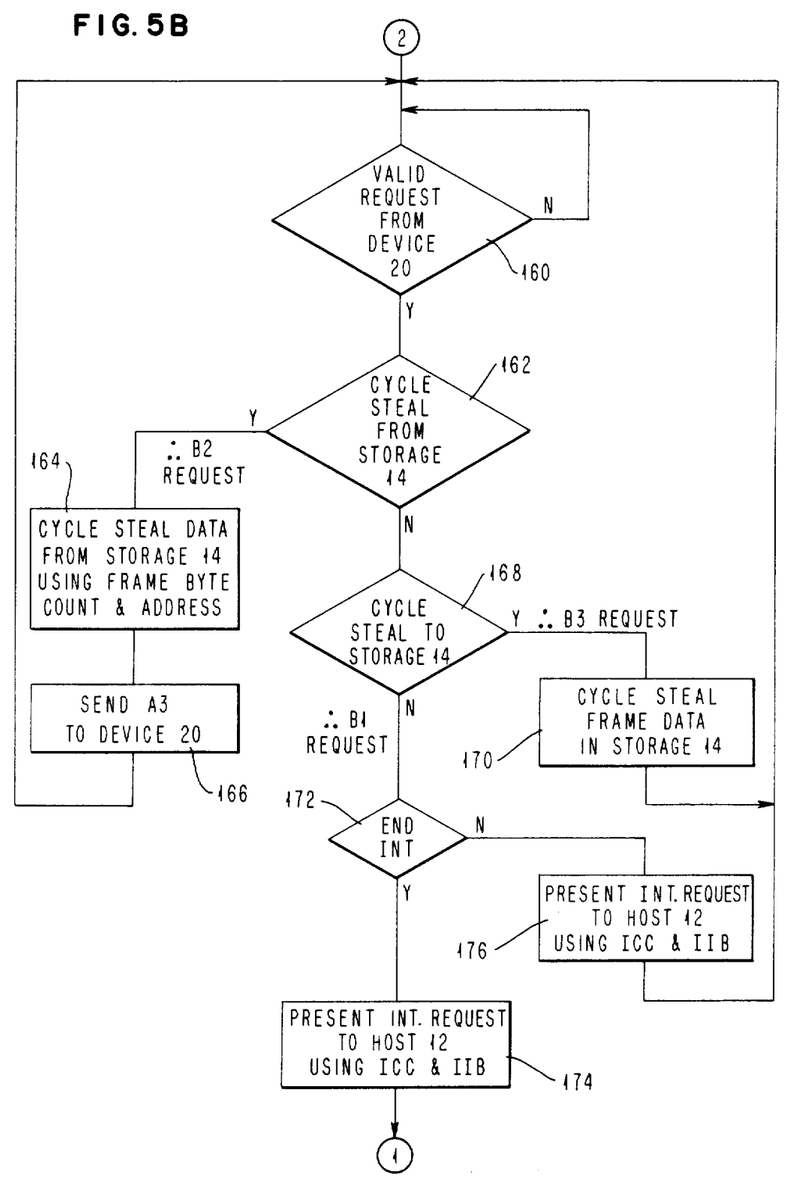
Figure 6:
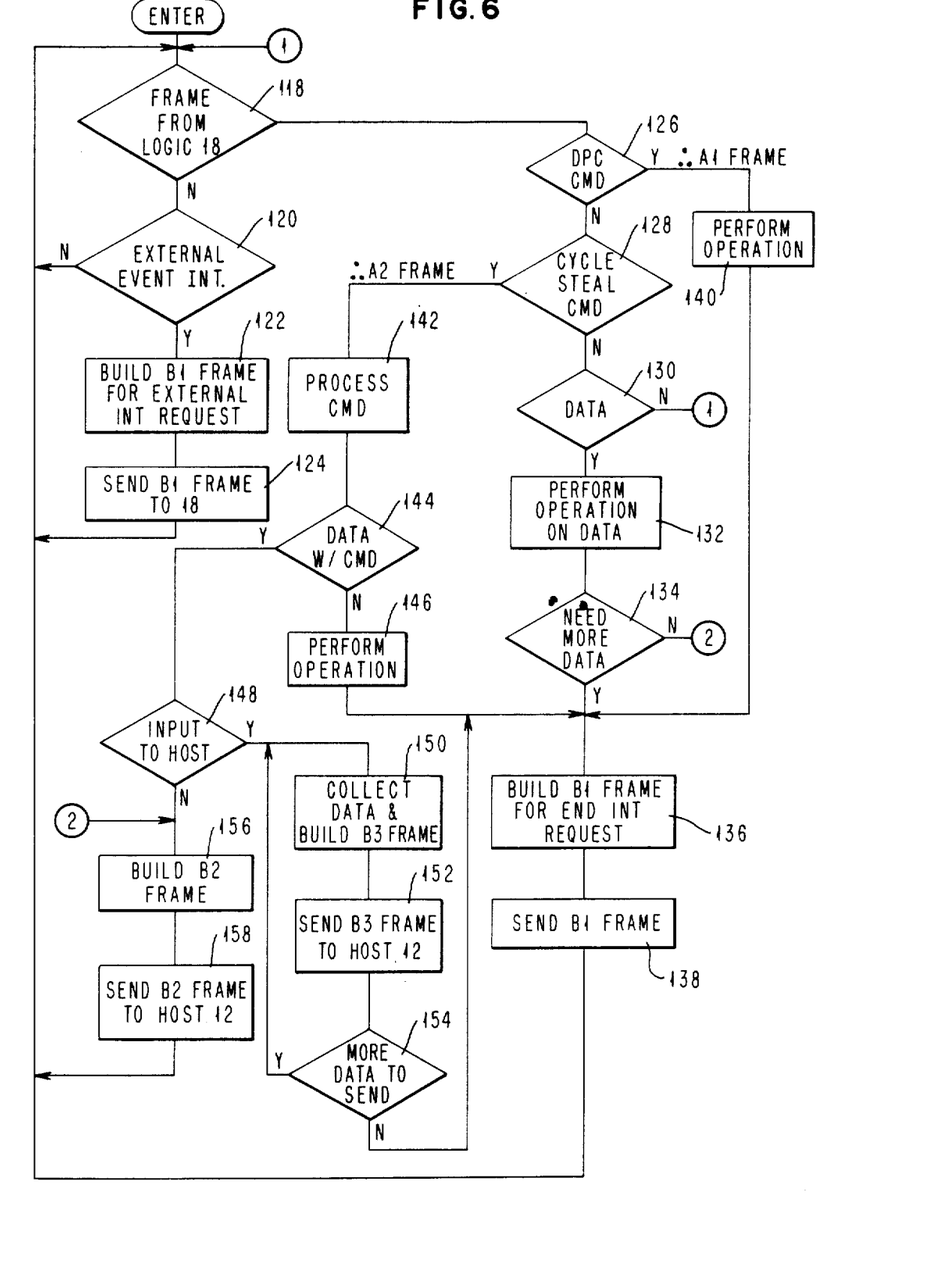
FIG. 6 is a flow diagram of the operation of the microprocessor shown in FIG. 4.

As previously mentioned, FIGS. 5A, 5B and 6, show a flow diagram of the operation of the I/O channel extension logic 18 and the associated logic in I/O devices 20 will now be described. However, prior to discussing the operation of the circuits in FIGS. 3 and 4, it is necessary to understand some basic functions which are performed by both the host processor 12 and the I/O devices 20. Normally, device controllers perform the following functions which are related to the host channel 16. First, the device controllers accept and perform the I/O commands from the host. These commands may either be in the form of a direct program control (DPC) command or a cycle steal command. In the event a cycle steal command is given to the device controller, it does one of three things, that is, obtains the DCB, obtains the DCB plus data, or obtains the DCB and provides data. In addition, the device controller must have the capability of interrupting the host 14 to indicate that a command termination has occurred due to either the completion of the execution of the command or the occurrence of an error or exception. Lastly, the device controller must be able to interrupt the host 12 to call attention about some external event to the host; for instance, in the case that the device 20 is a printer, it may be necessary to call attention that the paper supply is empty or in the case that the device 20 is a keyboard display terminal, the depression of certain keys must be called to the attention of the host.

Figure 7:
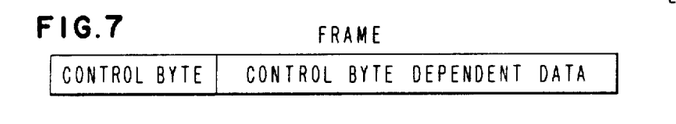
FIG. 7 shows a frame of information communicated over the serial line between the I/O channel extension logic and an I/O device.

The information passed from logic 18 to an I/O device 20 over either line 22 or 24 is hereafter referred to as a frame and a frame has the format shown in FIG. 7. That format includes a control byte, or other header type information, followed by control byte dependent data. The control byte identifies the type of frame and defines the format of the control byte dependent data. There are three different types of frames which can be sent from logic 18 to an I/O device 20 and these are labeled types A1, A2, A3 and defined by the chart shown in FIG. 8.

The A1 and A2 frames type are commands to the I/O device 20 to perform a particular function and the A3 type frame is the data being supplied to the I/O device 20. The differentiation between a command, that is an A1 or an A2 type frame, is signified by specific bits within the control byte. The differentiation between an A1 and A2 type frame is signified by the IDCB following the control byte which determines whether the particular command is a DPC command, that is an A1 type frame, or a cycle steal command, that is an A2 type frame. If the IDCB indicates a DPC command is being issued, then the data portion of the frame includes the one byte IDCB command field plus the two bytes of the IDCB data field, as shown in FIG. 2B. If the IDCB indicates that a cycle steal command is being issued, then the data field portion of the frame includes the one byte IDCB command field plus the 16 bytes of the DCB shown in FIG. 2C.

Logic 18 can only send data, that is an A3 type frame, to an I/O device 20 in response to a request for data therefrom, which request must indicate how many bytes of data are requested and from what address in the host storage 14. When data, that is an A3 type frame, is being communicated from logic 18 to I/O device 20, as indicated by the code in the special bit field of the control byte of the frame, the data portion of the frame includes a two byte block of data manifesting the byte count followed by the number of bytes of data manifested by that byte count.

Figure 9:
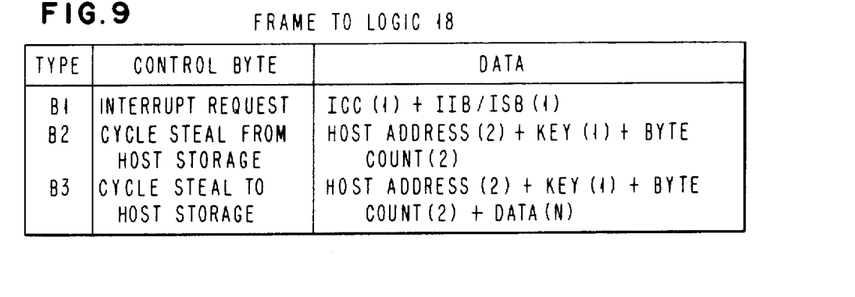
FIG. 9 is a chart showing the types of frames which can be sent by an I/O device.

When I/O device 20 desires to communicate back to host processor 12 or host storage 14 through logic 18, it sends one of three different types of communications shown in FIG. 9, which are in the frame format shown in FIG. 7 and labelled as the B1, B2 and B3 type frames. The B1 type frame is an interrupt request which is used by the I/O device 20 to indicate that it has either completed processing the command or that an exception (error) has occurred or that an external event has occurred. The format of the interrupt request frame response is a control byte specifying an interrupt followed by data which consist of one byte containing the interrupt condition code and one byte containing either an interrupt information byte (IIB) or an interrupt status byte (ISB), which specify the type of interrupt.

The second type of response the I/O device makes to the logic 18 is contained in the B2 type frame and is a request to cycle steal data from host storage 14. The B2 type frame contains a control byte and a data field, where the data field portion of the frame consists of the address of the host memory at which the block of data to be transmitted begins, a single byte key and a two byte data block defining the number of bytes to be transferred from host storage 14 to the I/O device 20. The data in the key byte may be used to allow I/O device access to host storage 14 and thus acts as a security protection.

The final type of response I/O device 20 can make to host 12 is contained in the B3 type frame and is a request for logic 18 to cycle steal data from I/O device 20 into host storage 14. The B3 type frame contains a control byte and data field, where the data field of the frame includes the host storage 14 address into which the data is to be stored, a protection key byte, a two byte field containing the byte count of the data to be stored followed by the N bytes of data to be stored.

It should be noted that the particular type of request I/O device 20 makes of logic 18 is determined by a bit field in the control byte. The data following the control byte is then function dependent.

With this background in mind, reference is now made to FIGS. 5A, 5B and 6 which are being used to explain the operation of the circuits shown in FIGS. 3 and 4. It should be understood that FIG. 5A represents that portion of the operation of logic 18 which occurs prior to sending one of the A type frames to I/O device 20 and FIG. 5B represents the action of logic 18 in responding to a request from an I/O device 20. FIG. 6 represents the action of the I/O device 20 logic in responding to an A type frame and sending a B type frame. The flow diagram shown in both FIGS. 5A and 5B represents the program contained in microprocessor 50 shown in FIG. 3 and the flow diagram shown in FIG. 6 represents the program contained in microprocessor 72. The operations represented by FIGS. 5A, 5B and 6, of course, are not the only functions which microprocessors 50 and 72 perform and it should be understood that the flow diagrams in FIGS. 5A, 5B and 6 represent only that part of the microprocessors 50 and 72 program related to the subject invention. Things like power on initiations, diagnostics and error retry and recovery have been eliminated as forming no part of the subject invention.

Referring specifically now to FIG. 5A, the basic flow of the microprocessor 50 program is a loop awaiting some action. The basic loop starts with block 100 in which a determination is made whether an Operate I/O command had been presented from host processor 12. If such a command is in the host processor 12 program, an appropriate signal over the control bus informs microprocessor 50 of that fact. However, assuming that no Operate I/O command was presented by host 12, then according to block 102, it is next determined whether an interrupt request from one of the I/O devices 20 is presented. This can occur by a signal being transmitted over lines 22 or 24 through one of the ports 62, line driver receiver circuits 60 and SERDES 58 onto the microprocessor channel 36. If no interrupt request from an I/O device 20 had been received, then a return to the beginning of the program is indicated and block 100 and 102 are continually repeated until either an Operate I/O command or an interrupt request is detected.

If at block 102, an interrupt request is detected, then according to block 104, a determination is made whether it is an external event interrupt or not. As will be recalled, an external event interrupt is one such as the depression of a key on a keyboard, or an indication of out of paper on a printer. If the interrupt is determined not to be an external event interrupt, that is, it is a command termination interrupt, then according to block 104, a return to the beginning of the program prior to block 100 is indicated and the interrupt is essentially ignored as meaningless.

If at block 104 it is determined that the interrupt is an external event interrupt, then according to block 106, the interrupt is presented to the host processor 12 for further processing and a return to the beginning of the loop prior to block 100 is indicated. The interrupt request is presented to host 12 by conventional means such as providing data on the microprocessor channel 36 to be stored in data register 46 or condition code register 48 and sending the appropriate control lines of a control portion of channel 36 to the control register 34. The host processor 12, in turn, reads the control register 34 and the data register 46 and acts appropriately.

Returning again to block 100, if it had been determined that an Operate I/O command had been presented from the host processor 12 and the appropriate communication thereof had been made to microprocessor 50, then the determination at block 100 is yes and the continuation at block 108 indicates that the IDCB is fetched and stored in the RAM 52 associated with microprocessor 50. Next, as indicated at block 110, the IDCB is examined and a determination is made whether the command is a direct programming control (DPC) command or a cycle steal command. If the indication is that the command manifested by the IDCB is a cycle steal command, then microprocessor 50 cycle steals from the host storage 14 the DCB pointed to by the IDCB. This occurs by the microprocessor 50 controlling DMA 38 in a known manner to cause DMA 38 to address host memory 14 directly and cycle steal the data therefrom through bypass register 32 directly into RAM 52.

Figure 8:
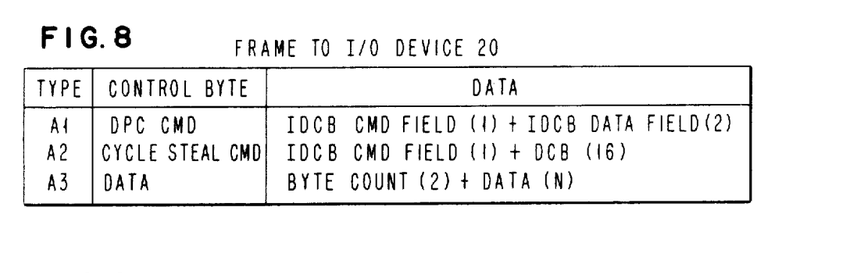
FIG. 8 is a chart showing the types of frames which can be sent by I/O channel extension logic.

Next, according to block 114, the A2 frame, which as seen from FIG. 8, consists of the IDCB command byte plus the 16 byte DCB, is sent from logic 18 to the I/O device 20. This occurs by microprocessor 50 combining the information taken from RAM 52 and sending it over to microprocessor channel 36 to a SERDES 56, which converts the parallel information on channel 36 to serial information and sends it over the serial line through the line drivers/receivers and the output port to either line 22 or 24.

If at block 110 it had been determined that a DPC command had been sent, then according to block 118, the A1 type frame is sent, which as seen from FIG. 8, consists of the IDCB command field plus the IDCB data field. The A1 type frame information is sent over the microprocessor channel 36 through the SERDES 56 and line driver/receivers 60 to the port connector 62 and the lines 22 or 24 serially connected to I/O device 20.

At this point in time, an A type frame has been communicated from logic 18 to the selected one of the I/O devices 20. FIG. 5B relates to the processing of a response from the I/O device 20 to that signal and FIG. 6 relates to the processing of communicated A type frame information by the I/O device 20. Accordingly, in real time, FIG. 6 next occurs and will be now described.

Thus, referring to FIG. 6, first, according to block 118, the decision is made whether a frame signal from logic 18 has been presented. If not, block 120 indicates that a second decision is determined whether an external event requiring an interrupt has occurred. If no external event has occurred, then a return to the beginning at block 118 results and the loop of block 118 and block 120 is continued until either a frame is detected or an external event occurs.

If an external event is detected at block 120, then according to block 122, a B1 frame is built which, as seen from FIG. 9, consists of an interrupt condition code byte and an interrupt information byte or interrupt status byte. The B1 frame then is communicated to logic 18, as indicated by block 124. The communication of the B1 frame to logic 18 occurs in a manner similar to that described for the sending of information from logic 18 to an I/O device 20. More specifically, the information is applied by the microprocessor 72 over device channel 70 to the SERDES, where it is serialized and sent through line driver/receiver 66 and the output port 64 over the serial link back over logic 18.

If at block 118, it had been determined that a frame was presented to the I/O device 20 logic, then according to block 126, a determination is made whether the frame presented is a DPC type command, that is, an A1 type frame. If not, then according to block 128, a determination is made whether the frame presented is a cycle steal command, that is, an A2 type frame. If it is determined that neither a DPC or cycle steal command is presented, then, as indicated at block 130, a determination is made whether the information contained in the frame is data. If not, the frame is ignored and a return to the beginning at block 118 occurs. If the frame is determined to contain data that is an A3 type frame, then according to block 132, the operation previously commanded to be performed on the data is performed; for instance, if a previous command had indicated to print certain data and the data is now being sent, that data would be printed.

Next, according to block 134, the determination is made whether more data is needed. If no more data is needed, then block 136 indicates that a B1 frame is built, to indicate an end interrupt request is to be sent. This indicates that the I/O device 20 has completed the execution of the command. Finally, according to block 138, the B1 frame is sent as previously explained over the serial link 22 or 24 back to the logic 18.

If at block 126 it had been determined that a DPC command had been presented to I/O device 20, then as indicated at block 140, the operation manifested by the DPC command is performed and a continuation of block 136 ensues, whereby the I/O device informs logic 18 by an end interrupt request that it had completed performing the operation.

If at block 128 it had been determined that a cycle steal command is presented to I/O device 20, that is, an A2 type frame had been presented, then block 142 indicates that the cycle steal command is processed. Next, according to block 144, a determination is made whether there is data associated with that cycle steal command. If not, then according to block 146, the operation commanded is performed and a continuation at block 136 for building the end interrupt request occurs. It should be noted that some cycle steal commands do not have data other than the DCB itself associated therewith. For instance, changing margins or going to a new line are too complex for the DPC command and, accordingly, require the additional information in the device dependent bytes of the DCB. However, these commands do not require any additional data as would be the case if, for instance, printing a line of information were to occur.

If at block 144 it had been determined that data was associated with the cycle steal command, then according to block 148, it is determined whether the data is to be stored by cycle steal techniques in host storage 14 or to be cycle stolen from the host storage 14. If the data is to be sent to the host storage 14, then the block 150 indicates that the data is collected and a B3 type frame is built and block 152 indicates that the B3 frame is sent to the logic 18 and ultimately to host storage 14 in the manner previously described. Next, at block 154, a determination is made whether more data needs to be sent. If so, blocks 150 and 152 are repeated. If no additional data is sent, then a continuation occurs at block 136 where the end interrupt request is built and then sent.

If at block 148 it had been determined that data is to be cycle stolen from host storage 14, then block 156 indicates that a B2 type frame is built specifying the address and amount of data desired, and block 158 indicates that the frame is sent to logic 18 which controls the cycle stealing of the data from host storage 14 in the manner previously described. Thereafter, a return to the beginning of the flow diagram at block 118 occurs.

After the data requested at block 158 is received, the processing would be through blocks 118, 126,128,130,132 and 134. If at block 134, it had been determined that additional data was still needed, a jump from block 134 to block 156 would occur, and another B2 frame would be built and sent to logic 18 requesting additional data. Microprocessor 72 would keep track of the address at which the additional data is to be found in host memory 141 and add it to the B2 frame as it is built.

Referring now to FIG. 5B, the processing of the request from I/O device 20 will now be described. Such a request, of course, would be the B1, B2 and B3 type frames sent in accordance with the description given above with respect to FIG. 6. First, referring to block 160, a determination is made whether a valid request from device 20 had been sent. If not, block 60 is continually repeated until such a request is received. Then, according to block 162, the determination is made whether the request is a cycle steal from storage request, that is, a B2 request. If so, block 164 indicates that data is cycle stolen from host storage 14 and the frame byte count and host storage 14 address within the B2 frame are utilized in determining which data and the amount of data is to be cycle stolen. Then, according to block 166, the cycle stolen data is placed in an A3 type frame and sent to device 20 over the serial link in the manner previously described.

If at block 162 it is determined that no B2 request has been presented, then block 168 indicates that a determination is made whether the request is to cycle steal data to host storage 14, that is, whether a B3 request occured. In such events, the data provided in the B3 frame is stored by cycle steal techniques in the addressed portion of host storage 14, as indicated by block 170.

If at block 168 it is determined that the request was not a cycle steal to storage, then by implication an interrupt, or B1, request occurs and at block 172, a determination is made whether the B1 request is an end interrupt request. If it is, then, according to block 174, the end interrupt request is presented to host processor 12 using the ICC and IIB bytes to indicate that the command has been performed. If at block 172 it was determined that no end interrupt request occurred, then an external event interrupt occurred and according to block 176, the external interrupt request is presented to host 12 using the ICC and IIB, again to indicate what the interrupt concerns. Thereafter, block 176 indicates a return back to block 160 to await the next request from I/O device 20.

After the execution of block 174, a return to entrance point 1 shown in FIG. 5A occurs and the entire procedure just described in FIGS. 5A, 5B and 6 is again repeated.

What is claimed is:

1. A method of serially extending a parallel channel from a host processor to an I/O device, comprising the steps of:
   channel extension logic storing a command generated by the host processor;
   said channel extension logic generating a command frame manifesting the stored command and control information identifying the frame as a host command;
   said channel extension logic serializing the generated command frame and transmitting said serialized command frame to said device;
   said device analyzing said transmitted command frame and said device generating a response frame, including control information, manifesting one of either that data defined by said response frame is to be directly transferred from the main storage of said host processor to the device, that data included in said response frame is to be directly transferred to said main storage of said host processor from said device, or that the execution of the command by the device has been terminated;
   said device serializing the generated response frame and transmitting said serialized response frame to said channel extension logic;
   in the event that said response frame manifests that data is to be transferred from said host memory to said device, said channel extension logic cycle stealing the data from said host memory, serializing said data, transmitting said serialized data to said device, and repeating from said step of analyzing;
   in the event that said response frame from said device manifests that the data included in said response frame is to be stored in said host memory, said channel extension logic cycle stealing the data included in said response frame into said host memory; and
   in the event that said response frame from said device manifests that the execution of the command by the device has been terminated, said channel extension logic awaiting another command generated by said host processor.

2. The invention according to claim 1 wherein said step of cycle stealing data from said host includes the steps of:
   said channel extension logic generating a data frame manifesting control information and the data from said host memory;
   said channel extension logic serializing said data frame; and
   said channel extension logic transmitting said serialized data frame to said device.

3. In a system including host processor means and remote I/O device means in which said host processor means communicates over a parallel channel information in the form of data or commands to control said remote device, apparatus connected between said host processor means parallel channel and through a serial link to said remote device for allowing said remote device means to communicate with said host processor means as if said channel extended to said remote means, said apparatus comprising:
   means responsive to command information communicated by said host processor means for directing an operation to be performed by said remote device means;
   means for generating a control frame including control information and said command information, said control information designating the frame as containing said command information; and
   means for serializing said control frame and communicating said serialized control frame over said serial link to said remote device means.

4. The invention according to claim 3 wherein said remote device means includes means which responds to said communicated control frame by communicating a response frame indicating one of either that the operation directed by said host processor has been performed or that a data transfer is to occur between said remote device means and a memory associated with said host processor means.

5. The invention according to claim 4 wherein said channel extension logic apparatus further includes means for performing a cycle steal operation upon said memory in response to said response frame from said device indicating a data transfer.

6. The invention according to claim 4
   wherein said response frame indicates that a designated amount of data is to be transferred from a designated place of said memory to said remote device means, and
   wherein said apparatus further includes means operating in association with said channel for performing a cycle steal operation upon said memory to provide said designated data to said remote device means.

7. The invention according to claim 6 wherein said means for generating further generates a data frame including control information and said designated data, said control information indicating said designated data is included within said data frame, and said means for serializing further serializes said data frame and communicates said serialized data frame over said serial link to said remote device means.

8. The invention according to claim 7 wherein said means within said remote device means responds to said communicated data frame by communicating a response frame indicating one of either that the last directed operation has been performed or that a data transfer is to occur between said remote device means and said memory.

9. The invention according to claim 4 wherein said response frame indicates that a designated amount of data included within said response frame is to be stored in a designated place of said memory; and wherein said apparatus further includes means operating in association with said channel for storing said designated data in said memory by cycle steal techniques.

10. The invention according to claim 4 wherein said response frame indicates that said directed operation has been performed; and wherein said apparatus further includes means for communicating to said host means over said channel that said remote device means has performed said operation.

11. The invention according to claim 4 wherein said means included within said remote device generates a response frame indicating the occurrence of an external event; and wherein said apparatus responds to said external event response frame by communicating information manifesting the occurrence of said external event over said channel to said host processor means.

* * * * *